United States Patent
Lee et al.

(10) Patent No.: US 9,362,778 B2
(45) Date of Patent: Jun. 7, 2016

(54) SHORT DISTANCE WIRELESS DEVICE CHARGING SYSTEM HAVING A SHARED ANTENNA

(71) Applicant: Robert Bosch GmbH, Stuttgart (DE)

(72) Inventors: Huang Lee, Mountain View, CA (US); Lakshmi Venkatraman, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 147 days.

(21) Appl. No.: 14/207,825

(22) Filed: Mar. 13, 2014

(65) Prior Publication Data

US 2014/0266034 A1    Sep. 18, 2014

Related U.S. Application Data

(60) Provisional application No. 61/781,549, filed on Mar. 14, 2013.

(51) Int. Cl.
| | |
|---|---|
| *H02J 7/00* | (2006.01) |
| *H01F 38/00* | (2006.01) |
| *H02J 7/02* | (2016.01) |
| *H02J 17/00* | (2006.01) |

(52) U.S. Cl.
CPC ............ *H02J 7/025* (2013.01); *H02J 17/00* (2013.01); *H02J 2007/0096* (2013.01)

(58) Field of Classification Search
CPC ............ H02J 7/025; H04B 5/00; H01F 38/14
USPC ............ 320/108; 307/104; 455/41.1, 573
See application file for complete search history.

(56) References Cited

U.S. PATENT DOCUMENTS

| | | | | |
|---|---|---|---|---|
| 6,342,869 B1* | 1/2002 | Edvardsson | ........... | H01Q 1/243 343/702 |
| 6,664,770 B1* | 12/2003 | Bartels | ................ | B60C 23/0413 323/222 |
| 7,068,991 B2* | 6/2006 | Parise | ................... | B01F 5/0614 320/109 |
| 8,395,353 B2* | 3/2013 | Wang | .................... | H02J 7/0042 320/108 |
| 8,629,651 B2* | 1/2014 | Guccione | ............. | H02J 7/0054 320/107 |
| 9,024,576 B2* | 5/2015 | Maenpaa | ................ | H02J 7/025 320/108 |
| 2007/0281626 A1* | 12/2007 | Dobosz | ............... | H04B 1/0007 455/73 |
| 2007/0287508 A1* | 12/2007 | Telefus | ................... | H02J 5/005 455/572 |

(Continued)

FOREIGN PATENT DOCUMENTS

| | | |
|---|---|---|
| KR | 10-2012-0082499 A | 7/2012 |
| KR | 10-2013-0012787 A | 2/2013 |

OTHER PUBLICATIONS

International Search Report and Written Opinion corresponding to PCT Application No. PCT/US2014/026356, mailed Jun. 26, 2014 (12 pages).

*Primary Examiner* — M'Baye Diao
(74) *Attorney, Agent, or Firm* — Maginot Moore & Beck LLP

(57) ABSTRACT

A wireless charging system includes a power receiving antenna that also functions as a communication antenna. The wireless charging system includes a transmitter having a first antenna configured to transmit radio-frequency energy and a first electronic device. The first electronic device includes a second antenna, a first communication circuit operably connected to the second antenna, and a first power converter operably connected to the second antenna. The second antenna is configured to receive the radio frequency energy transmitted by the first antenna.

18 Claims, 3 Drawing Sheets

(56) References Cited

U.S. PATENT DOCUMENTS

| | | | |
|---|---|---|---|
| 2009/0081963 A1* | 3/2009 | Boren | H01Q 1/002 455/90.1 |
| 2009/0116415 A1* | 5/2009 | Kashima | H04B 7/1555 370/279 |
| 2009/0284227 A1* | 11/2009 | Mohammadian | G06K 7/0008 320/137 |
| 2009/0312046 A1 | 12/2009 | Clevenger et al. | |
| 2010/0190436 A1 | 7/2010 | Cook et al. | |
| 2010/0208627 A1* | 8/2010 | Cho | H04B 7/155 370/279 |
| 2011/0156640 A1* | 6/2011 | Moshfeghi | H02J 7/025 320/108 |
| 2011/0217927 A1 | 9/2011 | Ben-Shalom et al. | |
| 2012/0008714 A1* | 1/2012 | Rizwan | A61B 5/0031 375/295 |
| 2012/0013294 A1* | 1/2012 | Yeh | H02J 7/025 320/108 |
| 2012/0098484 A1* | 4/2012 | Cheng | H01F 38/14 320/108 |
| 2012/0187767 A1* | 7/2012 | Kanno | H02J 17/00 307/82 |
| 2013/0030892 A1* | 1/2013 | Liu | G06Q 30/02 705/14.16 |
| 2013/0234658 A1* | 9/2013 | Endo | H02J 7/025 320/108 |
| 2014/0132206 A1* | 5/2014 | Zhu | H02J 7/025 320/108 |
| 2014/0139179 A1* | 5/2014 | Chen | H02J 7/025 320/108 |
| 2015/0002086 A1* | 1/2015 | Matos | H02J 7/0052 320/108 |
| 2015/0022009 A1* | 1/2015 | Leabman | H02J 7/025 307/104 |

* cited by examiner

SHORT DISTANCE WIRELESS DEVICE CHARGING SYSTEM HAVING A SHARED ANTENNA

CLAIM OF PRIORITY

This application claims priority to U.S. Provisional Application Ser. No. 61/781,549 entitled "Short Distance Wireless Device Charging Via Shared Antenna" by Lee et al., filed Mar. 14, 2013, the disclosure of which is hereby incorporated herein by reference in its entirety.

TECHNICAL FIELD

The present disclosure relates to charging electronic devices, and, more particularly, to wirelessly recharging electronic devices.

BACKGROUND

Wireless powering of devices by using radio-frequency ("RF") signals (also referred to as "RF charging") is a developing technology. Current RF charging systems 10, as illustrated in FIG. 1, typically have a power source 14 coupled to an RF transmitting antenna 18. The transmitting antenna 18 transmits RF energy 22 to a receiving antenna 26 of an electronic device 30. The receiving antenna 26 collects the RF energy, which is then transmitted to a RF-to-DC converter 34, which converts the energy into DC power for use in a load 38 of the device 30, for example a battery.

The prior art power transfer mechanism has been used in the past for long distance power transfer for sensors disposed in hard-to-wire areas, or for eliminating cables to enable easy and cheap installation. Such a power transfer mechanism has also been used in the past for RFID applications to read information from tags. However, electronic devices operating with prior art recharging systems require one antenna for communication and data signal transfer, and a separate antenna to receive the RF energy. Providing an electronic device with multiple antennas results in a bulky and more expensive electronic device.

Another known method for wirelessly recharging devices is referred to as "inductive power transfer." Both the power source and the receiver need to have a coil attached. The power source delivers the power via coils. The device requires coils for recharging, which adds to hardware cost and increases the size of the devices. Moreover, inductive power transfer is sensitive to the relative orientation of the source coil and the receiver coil. High efficiency is achieved only when the two coils are properly aligned with respect to one another. Finally, inductive power transfer is only suitable for power transfer to a single device, since interference between devices has an adverse effect on transmission of inductive power to devices when there are multiple devices in close proximity to one another.

It would therefore be desirable to provide an improved power transmission and charging system for electronic devices.

SUMMARY

In one embodiment, a wireless charging system includes a power receiving antenna that also functions as a communication antenna. The wireless charging system includes a transmitter having a first antenna configured to transmit radio-frequency energy and a first electronic device. The first electronic device includes a second antenna, a first communication circuit operably connected to the second antenna, and a first power converter operably connected to the second antenna. The second antenna is configured to receive the radio frequency energy transmitted by the first antenna.

In another embodiment, a method of operating an electronic device comprises transmitting a first radio-frequency signal with a first antenna connected to a power source, receiving the first radio-frequency signal with a second antenna of an electronic device, and converting the received first radio-frequency signal to usable power with a power converter. The method further includes at least one of (i) receiving a second radio-frequency signal with the second antenna and transferring the received second radio-frequency signal to a communication circuit in the electronic device, and (ii) transmitting a communication signal received from the communication circuit with the second antenna.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
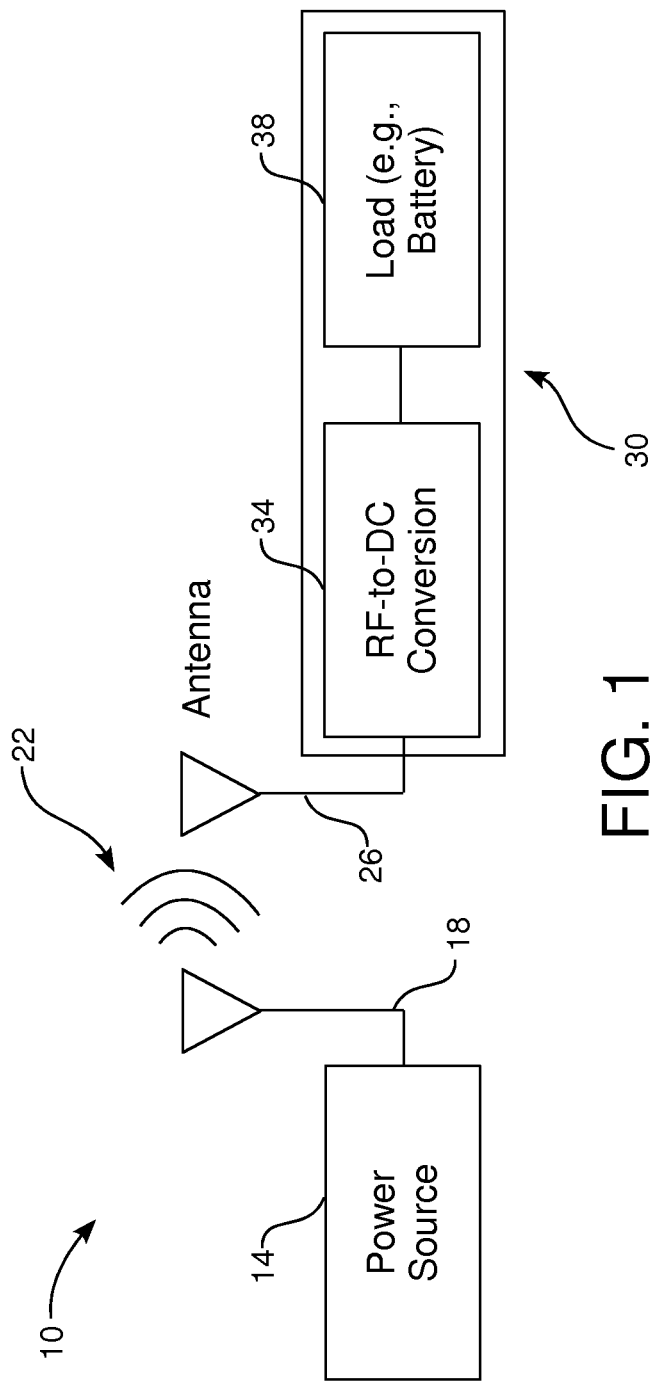
FIG. 1 is a schematic diagram of a prior art recharging system.
Figure 2:
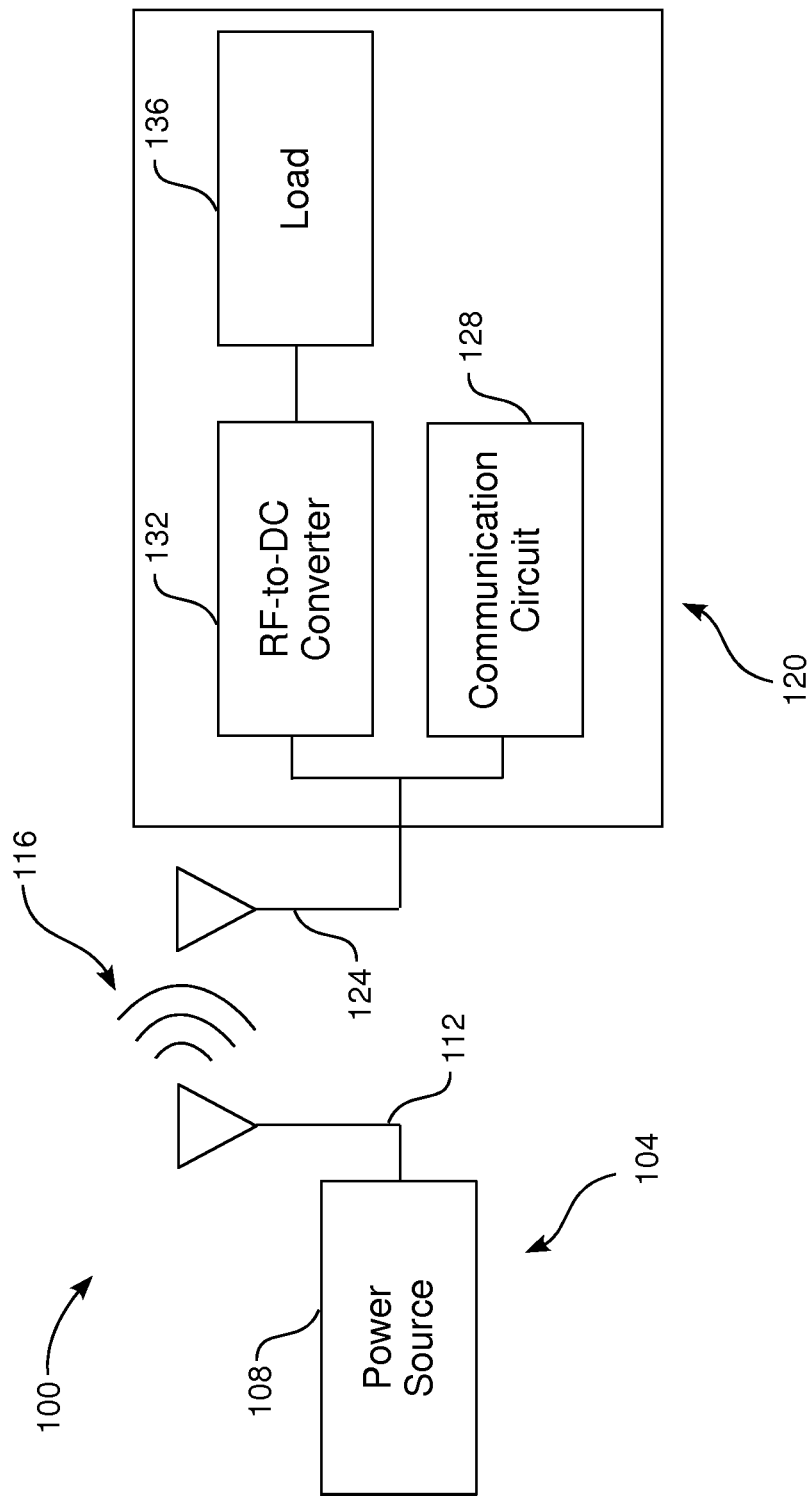
FIG. 2 is a schematic diagram of one embodiment of a recharging system.

One embodiment of a recharging system 100 is shown in FIG. 2. The charging system includes a source transmitter 104 having a power source 108 and a transmitting antenna 112. In one embodiment the power source 108 includes at least one battery, while in other embodiments the power source 108 is a wired power source, for example a building wall outlet or a wired power receptacle. The transmitting antenna 112 is configured to generate electromagnetic radio frequency waves 116.

A device 120 to be recharged includes a receiving antenna 124, a communication circuit 128, a RF-to-DC converter 132, and a load 136. The receiving antenna 124 is operably connected to the communication circuit 128 and the RF-to-DC power converter 132. The RF-to-DC converter is connected to the load 136, which, in one embodiment, is a rechargeable battery used to power the device 120.

In operation, the transmitting antenna 112 receives power from the power source 108 and produces the electromagnetic radio waves 116. The device 120 is placed in close proximity to the receiving antenna 112 such that the receiving antenna 124 receives the electromagnetic radio waves 116 generated by the transmitting antenna 112. Energy stored in the electromagnetic radio waves 116 is transferred to the RF-to-DC converter, which converts the energy from the radio waves to DC power. In some embodiments, an RF-to-AC power converter is used, depending on the type of power required for the load 136 of the device 120.

The receiving antenna 124 is also configured to receive a wireless communication signal, for example a Bluetooth, WiFi, Zigbee, TransferJet, UWB, NFC, EnOcean, dedicated short-range communication (DSRC), or RF communication signal. In some embodiments, the receiving antenna 124 receives a communication signal embedded in the electromagnetic radio waves 116 transmitted by the transmitting antenna 112. The communication signal received by the receiving antenna 124 is routed to the communication circuit 128 for operation the device 120. In some embodiments, the receiving antenna 124 is further configured to transmit communication signals, and in further embodiments the antenna 124 is configured only to transmit communication signals and does not receive communication signals.

In one embodiment, the device 120 is a Bluetooth-enabled wearable device, and the receiving antenna 124 is configured to receive a wireless signal to configure the device, in addition to the radio waves 116. In other examples, the device can be any wearable devices such as headphones, wristbands, watches, glasses, goggles, vests, visors, pins, belts, gloves, footwears, apparels, or the like, configured to receive a wireless communication protocol. The protocol can be for example Bluetooth, WiFi, Zigbee, TransferJet, UWB, NFC, EnOcean, dedicated short-range communication (DSRC), RF communication signal, or cellular communication signal. In this example, a headphone set is described. The Bluetooth-enabled wearable device only includes one antenna, which enables the device to be produced smaller than a wearable device having separate antennas for receiving wireless power and wireless communication.

Figure 3:
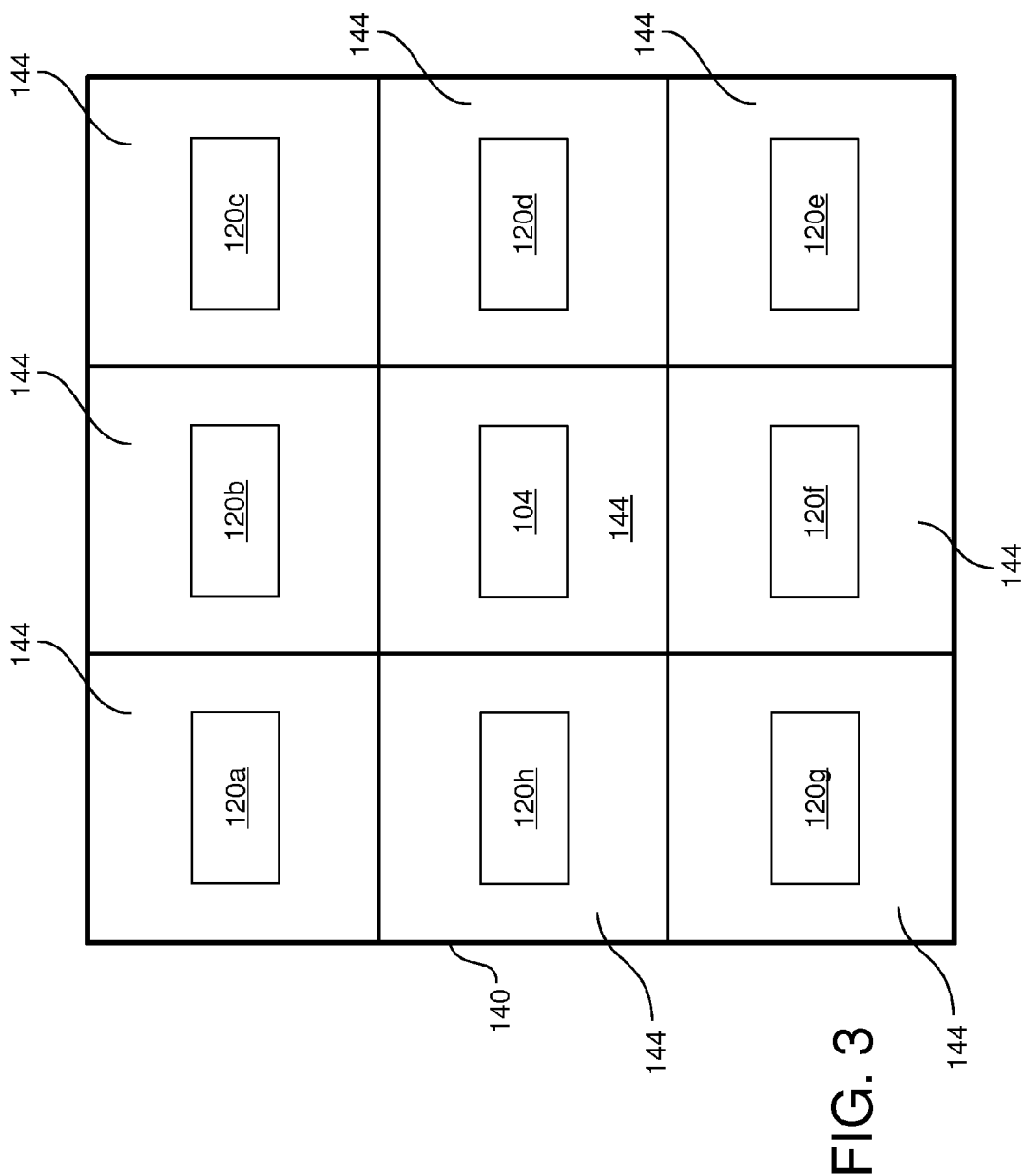
FIG. 3 is a schematic diagram of one embodiment of an enclosure used in conjunction with the recharging system of FIG. 2.

In some embodiments, the source transmitter 104 is configured as a stand-alone unit. However, as illustrated in FIG. 3, in other embodiments, the source transmitter 104 is positioned within a self-contained box or enclosure 140. One or more devices, such as devices 120a-h, are recharged within the enclosure 140 and are retained proximate to the source transmitter 104 in the enclosure 140. As shown, a source transmitter 104, which includes a power source 108 (FIG. 2), and each of devices 120a-h are disposed within separate, respective compartments 144 within the enclosure 140. All devices 120a-h within the enclosure 140 are configured to receive RF energy from the source transmitter 104 at the same time, i.e., simultaneously. Each of devices 120a-h includes a load in the form of a battery or super capacitor, for example, that is recharged by the RF energy received from the source transmitter 104. The devices 120a-h are configured to be recharged over a time period ranging from minutes to hours depending on the capacities of their respective loads. In some embodiments, the enclosure 140 is configured to confine a majority of the RF energy transmitted by the transmitting antenna within the enclosure 140, further improving the efficiency of power transmission and minimizing external transfer of RF energy.

The recharging system 100 provides several advantages. First, RF charging within a short distance provides power transfer in the milliwatt range, which is sufficient for recharging wireless devices such as Bluetooth-enabled waistband or headphones and wireless sensor nodes. Second, the power for recharging is received by an antenna that is also used for receiving communication signals. Multi-tasking the antenna reduces the cost and size of the devices. Third, the power source broadcasts the recharging power, and thus multiple devices in the enclosure can receive power at the same time. Devices charging in the enclosure have little or no effect on the recharging of other adjacent devices in the enclosure. Fourth, the amount of power from the source to the devices is less sensitive to the orientation/position of the device within the box as compared to other wireless power transfer systems, for example the inductive power transfer systems described above. Fifth, the RF energy waves are generally confined within the box, reducing perceived danger of radiation and enabling more efficient energy transfer to the devices.

Devices that may be wirelessly RF recharged according to the system disclosed herein typically include an antenna that is also used for wireless communications, such as Bluetooth-enabled head phones and wireless sensor nodes, and typically require a small amount of power for recharging (e.g., milliwatts). However, the reader should appreciate that the charging system described herein is not limited to wireless communication devices requiring only a small amount of power. Additionally, while the above embodiments are described with reference to charging and recharging a battery or capacitor of an electronic device, the reader should appreciate that the system disclosed herein is suitable for use to directly power an electronic device without storing the power in a battery or capacitor.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A charging system, comprising:
   a transmitter having a first antenna configured to transmit radio-frequency energy including (i) a first radio-frequency signal and (ii) a second radio-frequency signal; and
   a first electronic device including (i) a second antenna, (ii) a first communication circuit operably connected to the second antenna, and (iii) a first power converter operably connected to the second antenna,
   wherein the second antenna is configured to receive the radio-frequency energy transmitted by the first antenna,
   wherein the first power converter is configured to receive the first radio-frequency signal from the second antenna and convert the first radio-frequency signal to usable power, and
   wherein the first communication circuit is configured to receive the second radio-frequency signal from the second antenna.

2. The charging system of claim 1, wherein:
   the first electronic device further comprises a DC load operably connected to the first power converter; and
   the first power converter is configured to convert the received energy to DC power.

3. The charging system of claim 2, wherein the DC load includes a rechargeable battery.

4. The charging system of claim 1, wherein the transmitter is operably connected to a wired power receptacle.

5. The charging system of claim 1, wherein the transmitter is operably connected to a source battery.

6. The charging system of claim 1, further comprising:
   an enclosure configured to support the transmitter and the first electronic device.

7. The charging system of claim 6, wherein the enclosure is configured to confine radio frequency energy transmitted by the first antenna within the enclosure.

8. The charging system of claim 7, further comprising:
   a second electronic device within the enclosure including (i) a third antenna, (ii) a second communication circuit operably connected to the third antenna, and (iii) a second power converter operably connected to the third antenna, wherein the third antenna is configured to receive the radio frequency energy transmitted by the first antenna.

9. The charging system of claim 8, wherein the enclosure comprises:
a first compartment in which the transmitter is supported;
a second compartment in which the first electronic device is positioned; and
a third compartment in which the second electronic device is positioned.

10. The charging system of claim 6, wherein the enclosure includes a first compartment in which the transmitter is supported, and a second compartment in which the first electronic device is positioned.

11. An electronic device, comprising:
a RF antenna;
a communication circuit operably connected to the RF antenna; and
a power converter operably connected to the RF antenna,
wherein the RF antenna is configured to receive radio-frequency energy transmitted by a transmitting antenna,
wherein the radio-frequency energy includes (i) a first radio-frequency signal and (ii) a second radio-frequency signal,
wherein the power converter is configured to receive the first radio-frequency signal from the RF antenna and convert the first radio-frequency signal to usable power, and
wherein the communication circuit is configured to receive the second radio-frequency signal from the RF antenna.

12. The charging system of claim 11, further comprising:
a load operably connected to the power converter,
wherein the power converter is configured to convert the received energy to power usable by the load.

13. The charging system of claim 12, wherein the power converter is configured to convert the received energy to direct current power.

14. The charging system of claim 13, wherein the load includes a rechargeable battery.

15. A method of operating an electronic device comprising:
transmitting a first radio-frequency signal with a first antenna connected to a power source;
receiving the first radio-frequency signal with a second antenna of an electronic device;
converting the received first radio-frequency signal to usable power with a power converter; and
at least one of (i) receiving a second radio-frequency signal with the second antenna and transferring the received second radio-frequency signal to a communication circuit in the electronic device, and (ii) transmitting a communication signal received from the communication circuit with the second antenna.

16. The method of claim 15, wherein the converting of the radio-frequency signal to usable power further comprises converting the radio-frequency signal to direct current power.

17. The method of claim 16, further comprising:
transferring the direct current power to a battery of the electronic device.

18. The method of claim 15, further comprising:
positioning the electronic device in an enclosure in which the first antenna is supported.

* * * * *